UNITED STATES PATENT OFFICE.

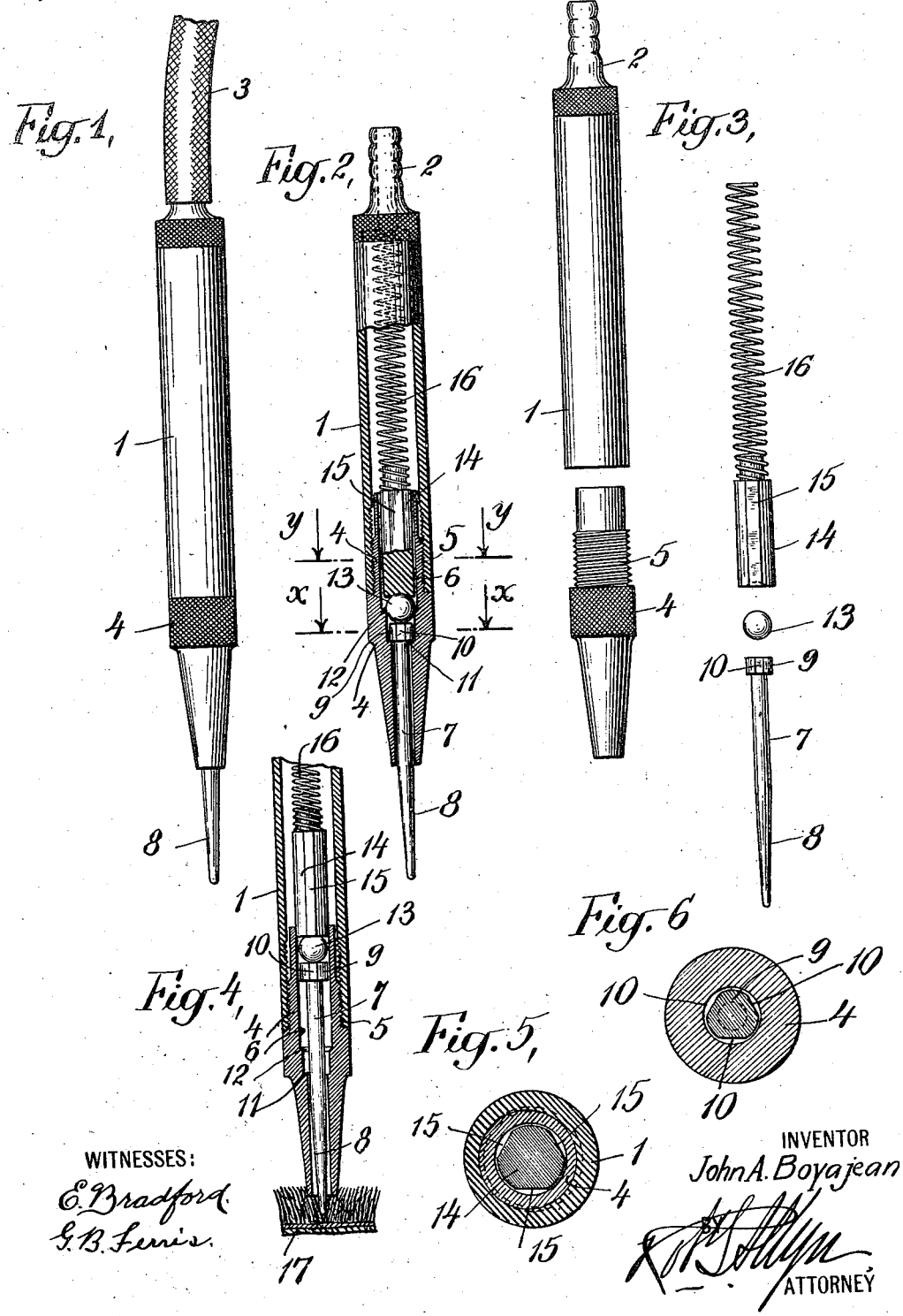
J. A. BOYAJEAN.
LIQUID COLORING IMPLEMENT.
APPLICATION FILED APR. 15, 1912.
1,141,522.
Patented June 1, 1915.
WITNESSES:
E. Bradford
G. B. Ferris
INVENTOR
John A. Boyajean
ATTORNEY

JOHN A. BOYAJEAN, OF JERSEY CITY, NEW JERSEY.

LIQUID-COLORING IMPLEMENT.

1,141,522.  Specification of Letters Patent.  Patented June 1, 1915.

Application filed April 15, 1912. Serial No. 690,739.

*To all whom it may concern:*

Be it known that I, JOHN A. BOYAJEAN, a citizen of the United States, and resident of Jersey City, in the county of Hudson and State of New Jersey, have invented certain new and useful Improvements in Liquid-Coloring Implements, of which the following is a specification.

My invention relates particularly to devices for applying dye stuffs to pile fabrics.

The object is to provide a simple, inexpensive, and reliable device which is not likely to get out of order and by means of which the operator can control the flow of liquid readily.

The invention contemplates the use of a long tracing member having a tapered point. The upper end of the tracing member is provided with a head fitting in a passage in the lower end of the instrument and a valve is provided adjacent thereto for controlling the flow of the fluid. The tracing member itself is so constructed as to assist in regulating the flow and the parts are so designed and located with reference to each other that no corrosion which may take place is likely to interfere with the use of the instrument.

Figure 1, is a side view of the instrument showing the end of a piece of tubing for supplying liquid to it. Fig. 2, is a side elevation and partial longitudinal section showing the parts in their position of rest. Fig. 3, is a side view showing the different parts separated. Fig. 4, is a fragmentary longitudinal view showing the parts of the tracing member and valve forced inward as they would be in use. Fig. 5, is a cross section on the plane of the line X, X, of Fig. 2. Fig. 6, is a cross section on the plane of the line Y, Y, of Fig. 2.

The tubular body of the instrument has a nipple 2 at its upper end for the attachment of the liquid supply tube 3. The outlet member 4 is threaded at 5 and screws into the lower end of the body 1. The outlet member has a longitudinal passage 6 extending through it in which are located the tracing member and the valve. The tracing member has a stem 7 and a long tapered point 8 and a head 9. The stem of the tracing member 7 is of slightly smaller diameter than the lower end of the passage 6 while the lower end is tapered substantially as shown in Figs. 2 and 4. The head 9 is flattened on the sides so as to leave passages such as 10, 10 (see Fig. 5) and rests against the seat 11 in the position shown in Fig. 2, the said head being received in the enlargement shown above said seat.

At the upper end of the enlargement above the seat 11 is a conical seat 12 on which normally rests the ball 13, said ball being received in the enlargement shown above the said conical seat. Above the ball 13 is a follower 14 flattened on the sides as at 15, 15 so as to leave longitudinal passages for the liquid. The upper end of the follower is engaged by a coiled spring 16 which presses the follower 14, the ball 13 and the tracing member downward so that the ball engages the seat 12, and the head 9 of the tracing member engages the seat 11 in the outlet member. There are thus provided, in effect, two valve seats, the ball valve and seat and the head valve and seat and this construction does away with the necessity for rubber packing or similar devices which are liable to deteriorate when not used.

The implement is held in the hand when used and the tip 8 of the tracing member is guided along the lines where it is desired to apply the color, for instance, in coloring pile fabric rugs as indicated by the fragment 17 in Fig. 4. The tracing member engages the fabric 17 at the root of the pile threads and as the implement is pressed downward the tracing member is forced inward retracting the ball 13 from the seat 12 and the head 9 from the seat 11. The liquid then which is usually under pressure from a suitable reservoir flows through the body 1, passes the follower 14, the ball 13, the head 9 and through the passage 6 and out around the lower end of the tracing member. The tracing member and the ball being freely rotatable in the outlet member 4 there is no danger of their becoming stuck or clogged when in use. The stem of the tracing member affords a suitable bearing in the outlet member and the tip being tapered permits greater freedom of flow of the liquid as the tracing member is pushed inward as shown in Fig. 4. When the pressure on the tracing member is released, the spring 16 closes the valves tight so as to prevent the escapement of liquid.

What I claim is:—

1. In an implement for applying coloring matter, a tubular body member provided with a long outlet passage having an annular seat surrounding the inner end thereof, an enlargement above said seat and a second enlargement above the first enlargement, and a spring pressed tracing member provided with a head on its upper end engaging the annular seat and normally received in the enlargement above the seat, a stem portion loosely guided in the passage, and a long tapered point projecting out beyond the end of the passage a distance at least equal to the length of the first enlargement aforesaid, whereby by pressure on the tracing point, the head on the tracing member may be forced up into the second enlargement to provide increased space and afford freer flow around and under the head and down around the tracing point.

2. In an implement for applying coloring matter, a tubular body member provided with a long passage having an annular seat surrounding the inner end thereof, an enlargement above said seat and a second enlargement above the first enlargement, a tracing and separating member provided with a head on its upper end normally received in the enlargement above the annular seat, a stem portion loosely guided in the passage, and a long tapered point projecting out beyond the end of the passage a distance at least equal to the length of the first enlargement aforesaid, whereby by pressure on the tracing point, the head on the tracing member may be forced up into the second enlargement to provide increased space and afford freer flow around and under the head and down around the tracing point, a ball above the head received in the second enlargement and fitting the upper end of the first enlargement to form a valve and a spring pressed follower slidingly engaged in the second enlargement above the valve therein.

JOHN A. BOYAJEAN.

Witnesses:
 ROBT. S. ALLYN,
 E. BRADFORD.